United States Patent Office 2,858,793
Patented Nov. 4, 1958

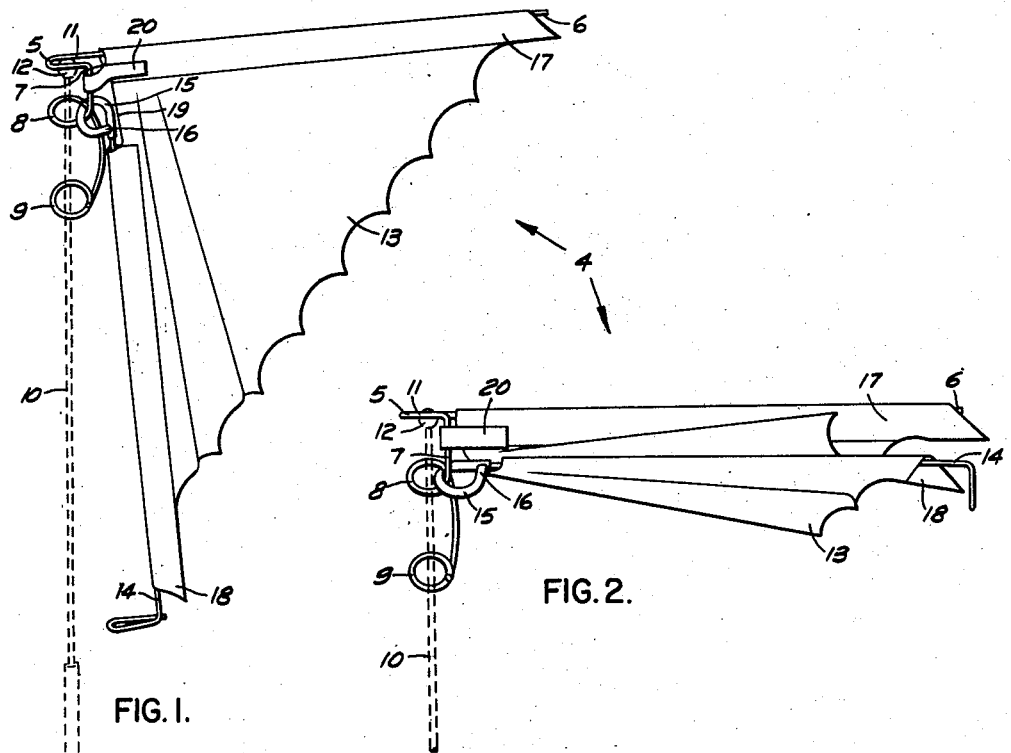
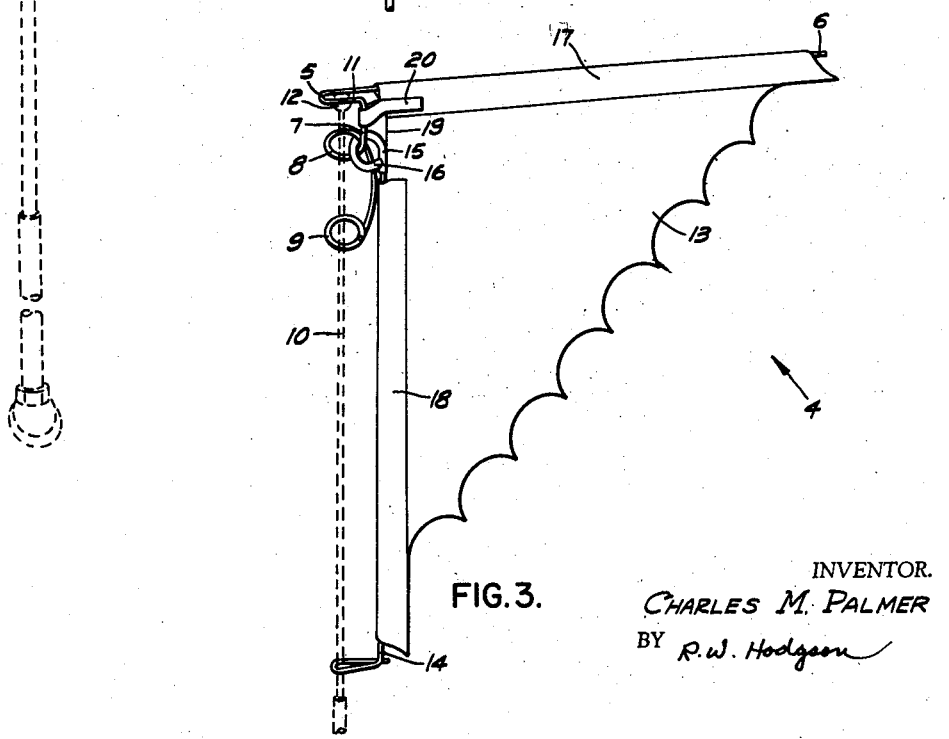

2,858,793
AERIAL IDENTIFICATION FLAG
Charles M. Palmer, Los Angeles, Calif.
Application August 5, 1957, Serial No. 676,095
4 Claims. (Cl. 116—173)

Generally speaking, the present invention relates to the automobile accessory art and, more specifically, relates to an aerial identification flag for an automobile.

A major problem that arises in conjunction with parking an automobile in parking lots, normally of the type where a parking space is leased for a period of time, is that there is usually great difficulty in finding your particular automobile. This is particularly a problem in large size parking lots where there are hundreds of automobiles and where even the slightest delay means a great many minutes lost in leaving the lot, and in some large parking lots, e. g. race track lots, a great deal of time can be lost by losing track of a particular automobile. It should be also noted that a large number of large scale parking lots are completely unmarked and some, even though marked off, are not entirely adequate so that there is a problem for the driver in finding his particular automobile after the event has taken place which required the parking of his automobile.

Applicant's invention was developed primarily to overcome the aforementioned problem and, generally speaking, can be said to consist of an aerial attachment member provided with a longitudinal, horizontally positioned, flag attachment arm and mounting means, and a hinged flag attachment member hingedly attached to the aerial attachment member. A flag, normally triangular and of plastic construction (although not so limited), is attached with respect to the flag attachment arm and the hinged attachment arm. The flag has sufficient display area so that suitable identification markings can be imprinted thereon.

From the above description of basic and generic forms of the present invention, it will be apparent to those skilled in the art that virtually all of the hereinbefore mentioned prior art problems and/or disadvantages are substantially entirely eliminated, met and/or overcome in and through use of the present invention.

For example, it is obvious that the aerial identification flag of the present invention is rapidly and easily attachable to the uppermost point of an automobile thereby making it most readily seen from a distance, and that, when mounted to an automobile aerial, it is very firmly positioned thereto in a manner which virtually completely eliminates the likelihood that the aerial identification flag of the present invention will become accidentally disengaged from the aerial.

With the above points in mind, it is an object of the present invention to provide an aerial identification flag which is easily seen from a distance.

It is a further object of the present invention to provide a device of the character set forth in the preceding object, which is extremely inexpensive, simple, easy to install and of virtually foolproof construction.

Other and allied objects will be apparent to those skilled in the art after a careful perusal, examination and study of the accompanying illustrations, the present specification, and the appended claims.

To facilitate understanding, reference will be made to the hereinbelow described figures, in which:

Fig. 1 is a perspective view of the present invention attached with respect to an automobile aerial (shown in phantom), and in an unfurled position on a normal windless day;

Fig. 2 is a side elevational view of the present invention, as shown in Fig. 1, with the car in motion; and Fig. 3 is a perspective view of the present invention as shown in Fig. 1, but with the lower slot on the hinged flag attachment member secured to the aerial, as would be customary on a windy day.

Generally speaking, the aerial identification flag of the present invention, indicated generally at 4 in Figs. 1–3, consists of a substantially L-shaped aerial attachment member 5 which includes a longitudinal, horizontally positioned, flag attachment arm 6 and downwardly directed mounting means 7. The aerial attachment member 5 is formed from an integral piece of metal rod normally.

The mounting means 7, as best shown in Figs. 1 and 3, is provided with spacedly opposed upper and lower loops 8 and 9 respectively, which are cooperable for locking encirclement of the automobile aerial 10, as shown in Figs. 1–3. The aerial attachment member 5 can be easily slipped on and off the aerial 10 with ease and without the use of any hand tools at all. A slot 11 is provided, at the junction of the mounting means 7 and the flag attachment arm 6, which is cooperable for lockingly engaging the decorative ball 12 at the apex of the aerial 10 and serves to position the aerial identification flag 13 at the uppermost point on the automobile, thereby making it easily seen from a great distance.

A hinged flag attachment member 14 having a single loop 15 at the upper end thereof is hingedly attached to the uppermost loop 8 of the mounting means 7. The loop 15 is provided with dielectric lining 16 to eliminate static. Also the loops 8 and 9 can be provided with dielectric lining 16 or a protective lining of some sort to prevent scratching of the aerial 10. The hinged flag attachment member 14 is preferably integrally formed from a metal rod, although not so limited.

A preferably substantially triangular flag 13 of integral plastic construction having display areas thereon suitable for imprinting advertisements, names, license numbers, or various other markings is attached with respect to the hinged flag attachment member 14 and the flag attachment arm 5. A first margin 17 overlaps itself and encircles the arm 5 along its entire length and is secured thereon by heat sealing or by some other attaching medium. A second margin 18 overlaps itself and encircles the hinged flag attachment member 14 partly along its length and is secured thereon preferably by heat sealing. The second margin 18 is provided with an upper unfettered edge 19 which serves as a pivot area for the flag 13 when the car is in motion whereby the flag 13 and the rod 14 may be actuated into the position indicated in Fig. 2.

The integral plastic strap 20, which encircles the mounting means 7 at the upper end thereof and is fixedly attached to the upper margin 17 by heat sealing, prevents the upper margin 17 from being actuated in the direction indicated by the arrow A, as shown in Fig. 2, and shearing the margin 18 along its entire overlapped length.

The hinged flag attachment member 14 is cooperable, when the automobile is in motion, to actuate itself into a substantially horizontal position causing the flag 13 to be moved into a furled position, as shown in Fig. 2, and being cooperable, when the automobile is at rest on a windless day, to maintain the identification flag 13 in an unfurled position, as best shown in Fig. 1. When the automobile is brought to a halt, the identification flag 13 is automatically actuated into the unfurled, identification, position.

The hinged flag attachment member 14 is provided with a slot 21 at the bottom thereof which is cooperable for lockingly engaging the aerial 10. This slot 21 is used on windy days when the identification flag 13 will not readily remain in an unfurled position.

It should be understood that the strap and the identification flag is preferably of integral plastic construction; however, the present invention is not necessarily limited to integral and plastic construction and other materials may be used with the present invention. Also the construction need not be integral.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed.

For example, it is obvious that the mounting means of the present invention may be modified substantially other than as specifically described and illustrated herein.

The exact compositions, configurations, constructions, relative positionings, and cooperative relationships of the various component parts of the present invention are not critical, and can be modified susbtantially within the spirit of the present invention.

The embodiment of the present invention specifically described and illustrated herein is exemplary only, and is not intended to limit the scope of the present invention, which is to be interpreted in the light of the prior art and the appended claims only, with due consideration for the doctrine of equivalents.

I claim:

1. An aerial identification flag for an automobile, comprising: an aerial attachment member provided with a longitudinal, horizontally positioned, flag attachment arm and downwardly directed mounting means; said mounting means including spacedly opposed loops cooperable for locking encirclement of an aerial; a hinged flag attachment member having a loop at the upper end thereof which is cooperable for hinged attachment to the uppermost one of said loops on said mounting means; attachment means on said hinged flag attachment member cooperable for lockingly engaging the aerial; a substantially triangular flag having one margin, overlapping itself and encircling said flag attachment arm and secured thereon, and having another margin, overlapping itself and encircling said hinged flag attachment member and secured thereon and provided with an upper unfettered edge, said flag having display areas thereon; a strap encircling said mounting means at the upper end thereof and fixedly attached to the overlapped margin on said flag attachment arm; said hinged flag attachment member being cooperable, when the automobile is in motion, to actuate itself into a substantially horizontal position and being cooperable, when the automobile is at rest, to maintain said flag into an unfurled position.

2. An aerial identification flag for an automobile, comprising: a substantially L-shaped aerial attachment member provided with a longitudinal, horizontally positioned, flag attachment arm and downwardly directed mounting means; said mounting means including spacedly opposed loops, cooperable for locking encirclement of an aerial, and a slot cooperable for lockingly engaging the decorative ball at the apex of the aerial; a hinged flag attachment member having a loop at the upper end thereof which is cooperable for hinged attachment to the uppermost one of said loops on said mounting means; attachment means on said hinged flag attachment member cooperable for lockingly engaging the aerial; a substantially triangular flag having one margin, overlapping itself and encircling said flag attachment arm along its entire length and being secured thereon, and having another margin, overlapping itself and encircling said hinged flag attachment partly along its length and being secured thereon and provided with an upper unfettered edge, said flag having display areas thereon; a strap encircling said mounting means at the upper end thereof and fixedly attached to the overlapped margin on said flag attachment arm; said hinged flag attachment member being cooperable, when the automobile is in motion, to actuate itself into a substantially horizontal position and being cooperable, when the automobile is at rest, to maintain said flag into an unfurled position.

3. An aerial identification flag for an automobile, comprising: a substantially L-shaped aerial attachment member provided with a longitudinal, horizontally positioned, flag attachment arm and downwardly directed mounting means; said mounting means including spacedly opposed loops, cooperable for locking encirclement of an aerial, and a slot cooperable for lockingly engaging the decorative ball at the apex of the aerial; a hinged flag attachment member having a loop at the upper end thereof which is cooperable for hinged attachment to the uppermost one of said loops on said mounting means; a slot at the opposite end of said hinged flag attachment member cooperable for lockingly engaging the aerial; a substantially triangular flag having one margin, overlapping itself and encircling said flag attachment arm along its entire length and being secured thereon, and having another margin, overlapping itself and encircling said hinged flag attachment partly along its length and being secured thereon and provided with an upper unfettered edge, said flag being of integral plastic sheet construction and having display areas thereon; a strap encircling said mounting means at the upper end thereof and heat sealed to the overlapped margin on said flag attachment arm; said hinged flag attachment member being cooperable, when the automobile is in motion, to actuate itself into a substantially horizontal position and being cooperable, when the automobile is at rest, to maintain said flag into an unfurled position.

4. An aerial identification flag for an automobile, comprising: an integral, substantially L-shaped aerial attachment member provided with a longitudinal, horizontally positioned, flag attachment arm and downwardly directed mounting means; said mounting means including spacedly opposed loops, cooperable for locking encirclement of an areial, and a slot cooperable for lockingly engaging the decorative ball at the apex of the aerial; a hinged, integral flag attachment member having a loop at the upper end thereof which is cooperable for hinged attachment to the uppermost one of said loops on said mounting means; a slot at the opposite end of said hinged flag attachment member cooperable for lockingly engaging the aerial; a substantially triangular flag having one margin, overlapping itself and encircling said flag attachment arm along its entire length and being secured thereon by heat sealing, and having another margin, overlapping itself and encircling said hinged flag attachment partly along its length and being secured thereon by heat sealing and provided with an upper unfettered edge, said flag being of integral plastic sheet construction and having display areas thereon; a strap encircling said mounting means at the upper end thereof and heat sealed to the overlapped margin on said flag attachment arm; said hinged flag attachment member being cooperable, when the automobile is in motion, to actuate itself into a substantially horizontal position and being cooperable, when the automobile is at rest, to maintain said flag into an unfurled position.

References Cited in the file of this patent

UNITED STATES PATENTS

| | | |
|---|---|---|
| 82,849 | King | Oct. 16, 1868 |
| 352,618 | Jones | Nov. 16, 1886 |
| 1,020,396 | Blank | Mar. 19, 1912 |
| 2,342,017 | Shepherd | Feb. 15, 1944 |